United States Patent

Vearil et al.

[15] 3,646,664
[45] Mar. 7, 1972

[54] TOOL EXCHANGER FOR A PLURALITY OF SPINDLES OF A MACHINE TOOL

[72] Inventors: Wayne L. Vearil, Milford; Lewis A. Dever, Cincinnati, both of Ohio

[73] Assignee: Cincinnati Milacron Inc., Cincinnati, Ohio

[22] Filed: May 28, 1970

[21] Appl. No.: 41,422

[52] U.S. Cl. ........................................................29/568
[51] Int. Cl. ...............................................B23q 3/157
[58] Field of Search ................................................29/568

[56] References Cited

UNITED STATES PATENTS

| 3,316,629 | 5/1967 | Meyer | 29/568 |
| 3,520,050 | 7/1970 | Trebble | 29/568 |
| 3,566,516 | 3/1971 | Brainard et al. | 29/568 |
| 3,571,912 | 3/1971 | Kielma | 29/568 |

*Primary Examiner*—Andrew R. Juhasz
*Assistant Examiner*—Z. R. Bilinsky
*Attorney*—Frank C. Leach, Jr.

[57] ABSTRACT

A shuttle, which has first means to support a first set of tools for disposition in a plurality of vertically disposed spindles and second means to receive a second set of tools in the spindles for support by the shuttle, is moved from a home position to a first position in which the tools in the spindles are transported to the shuttle for support by the second means. After the second set of tools has been removed from the spindles by a separate interchange arm for each spindle and received by the second means, the shuttle is moved to a second position in which the first set of tools can be transferred to the spindles by the interchange arms. The shuttle is then returned to its home position where the second set of tools is removed from the second means and a new set of tools is disposed in the first means to repeat the operation.

14 Claims, 11 Drawing Figures

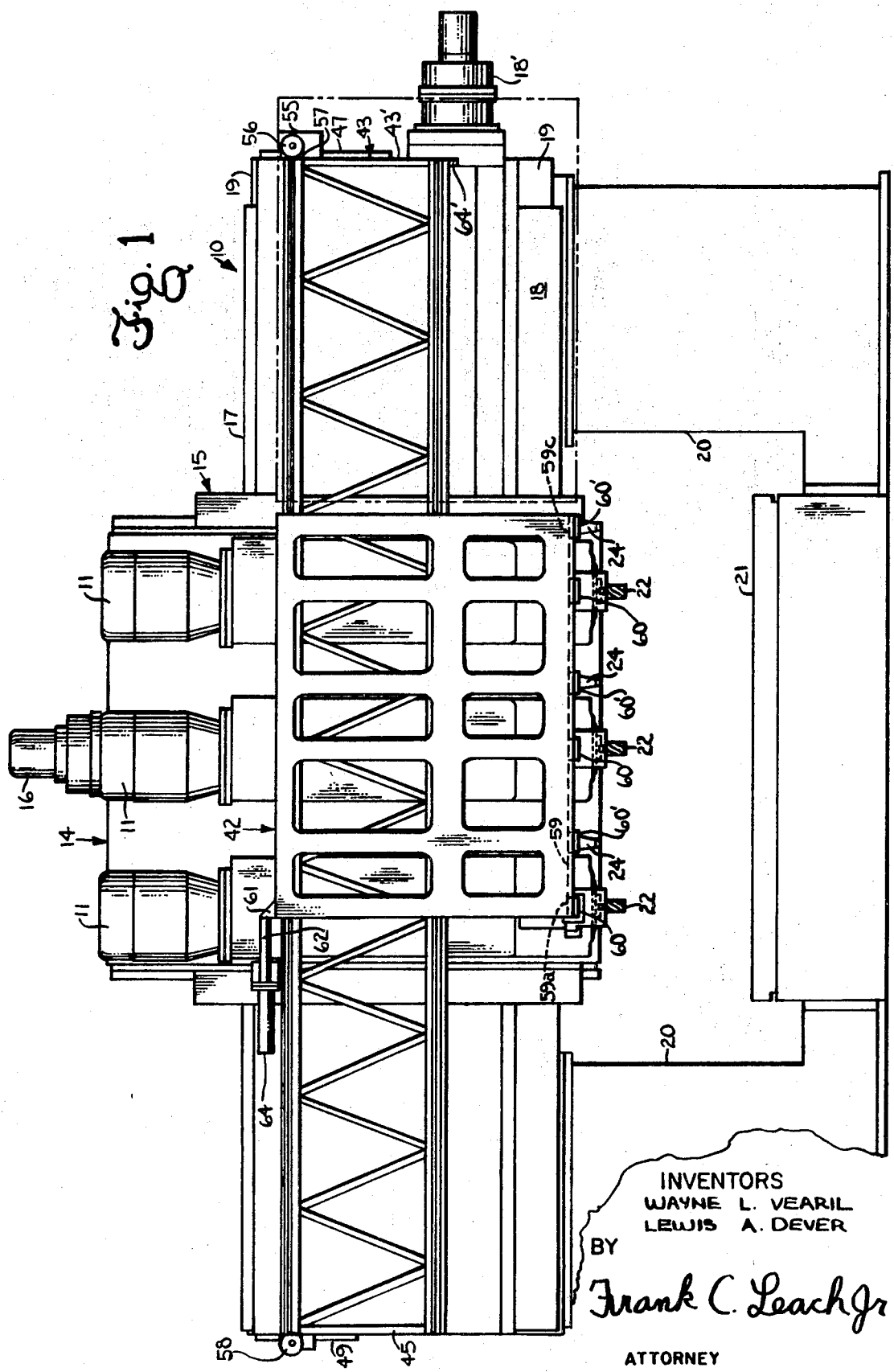

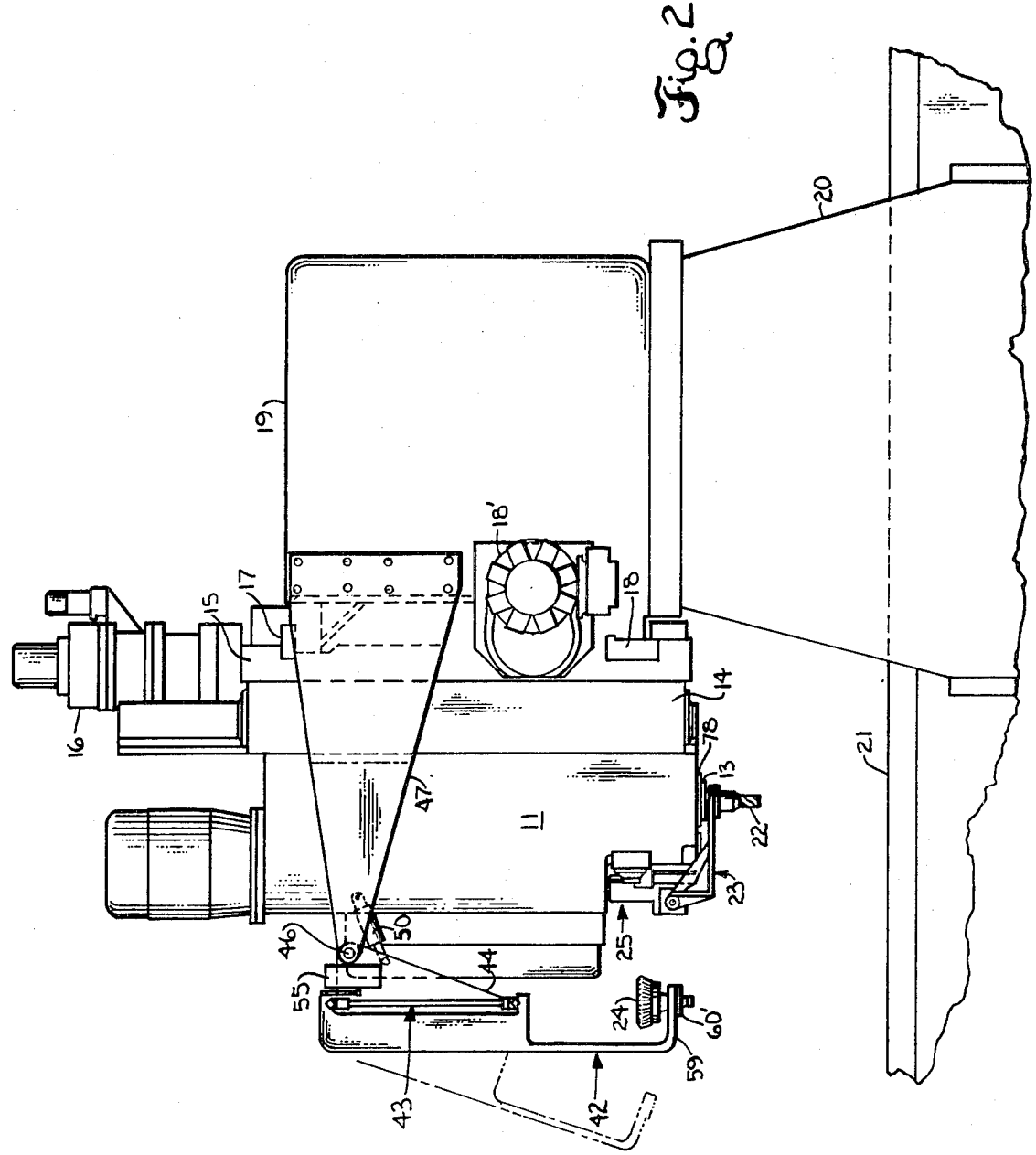

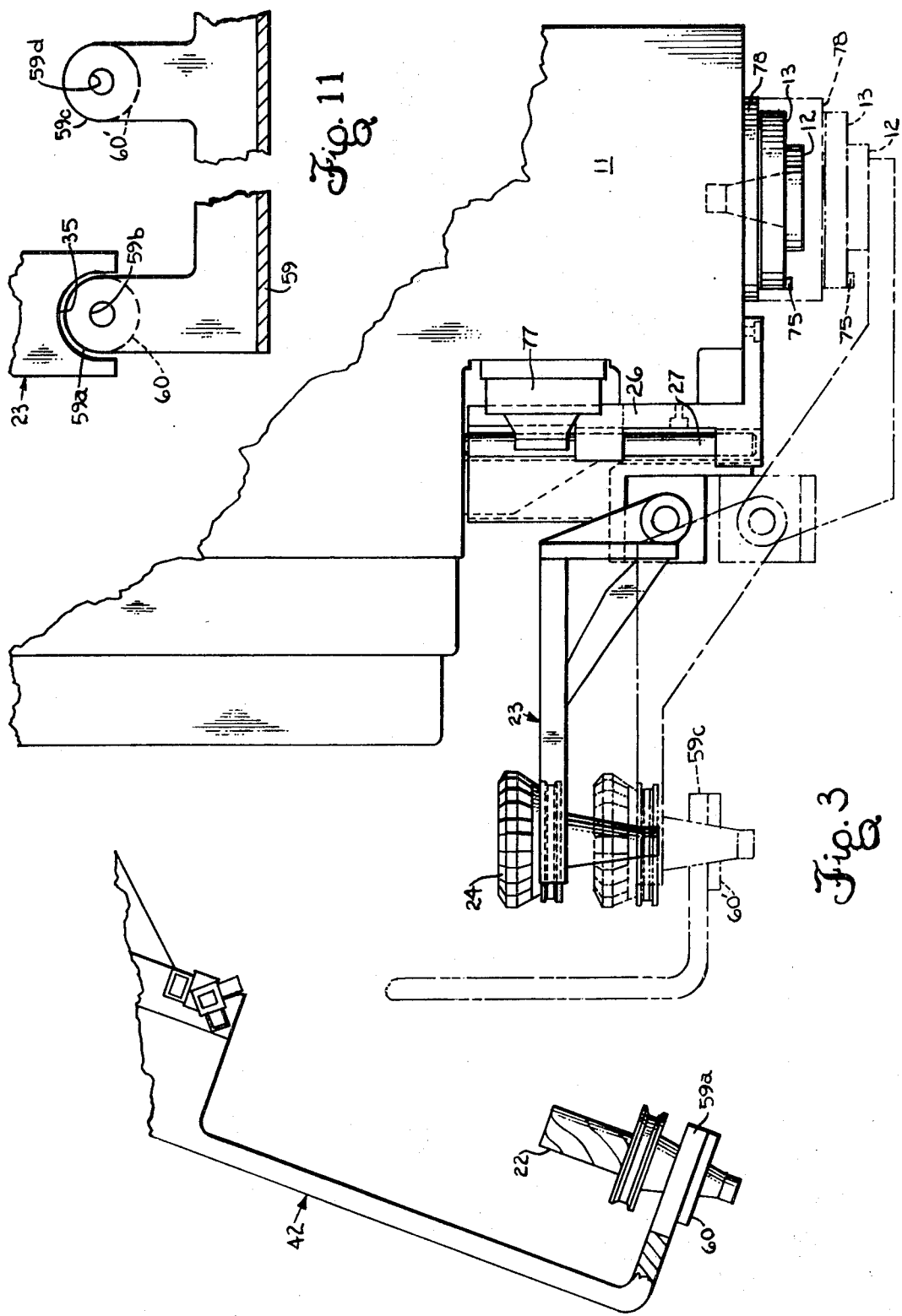

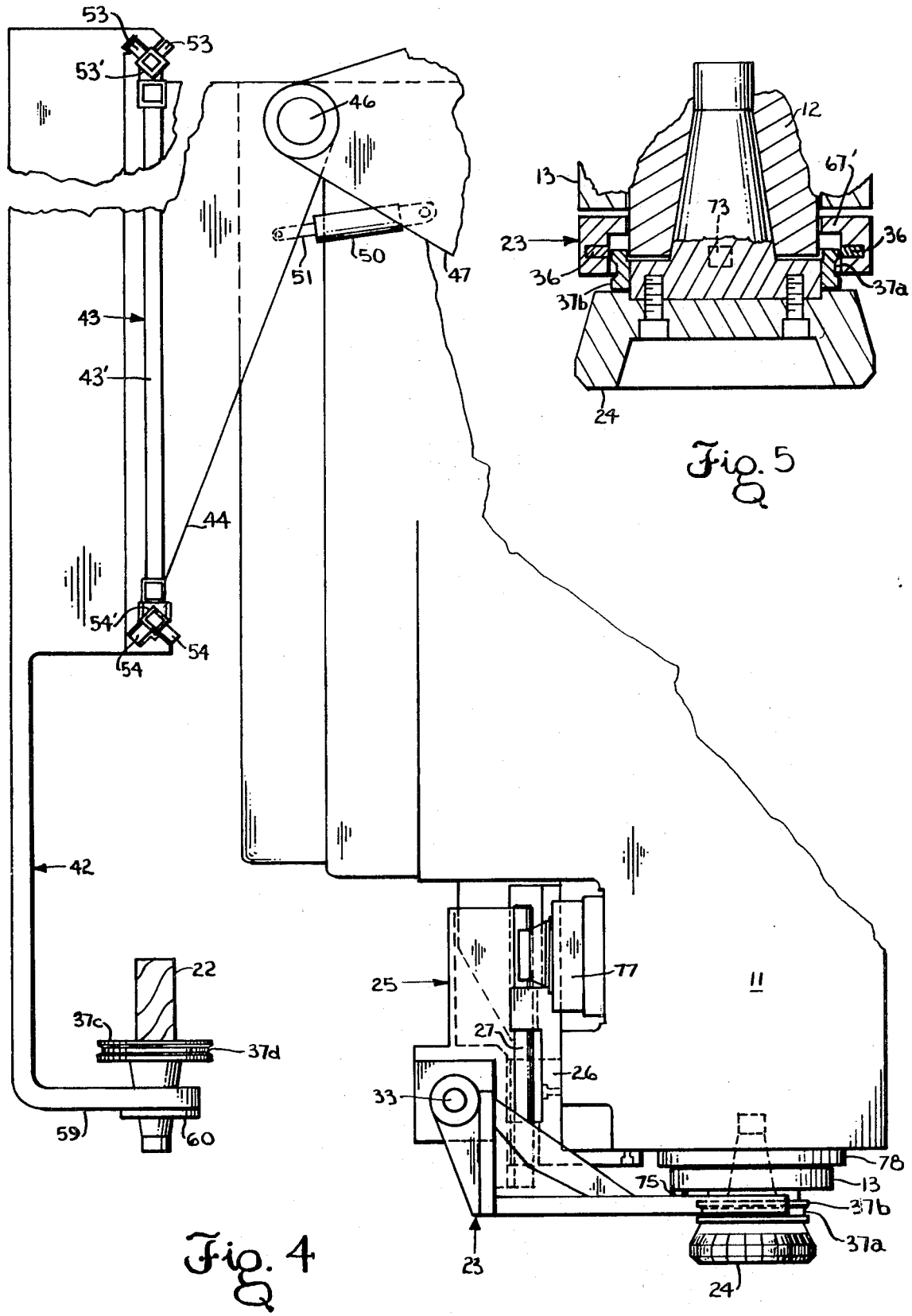

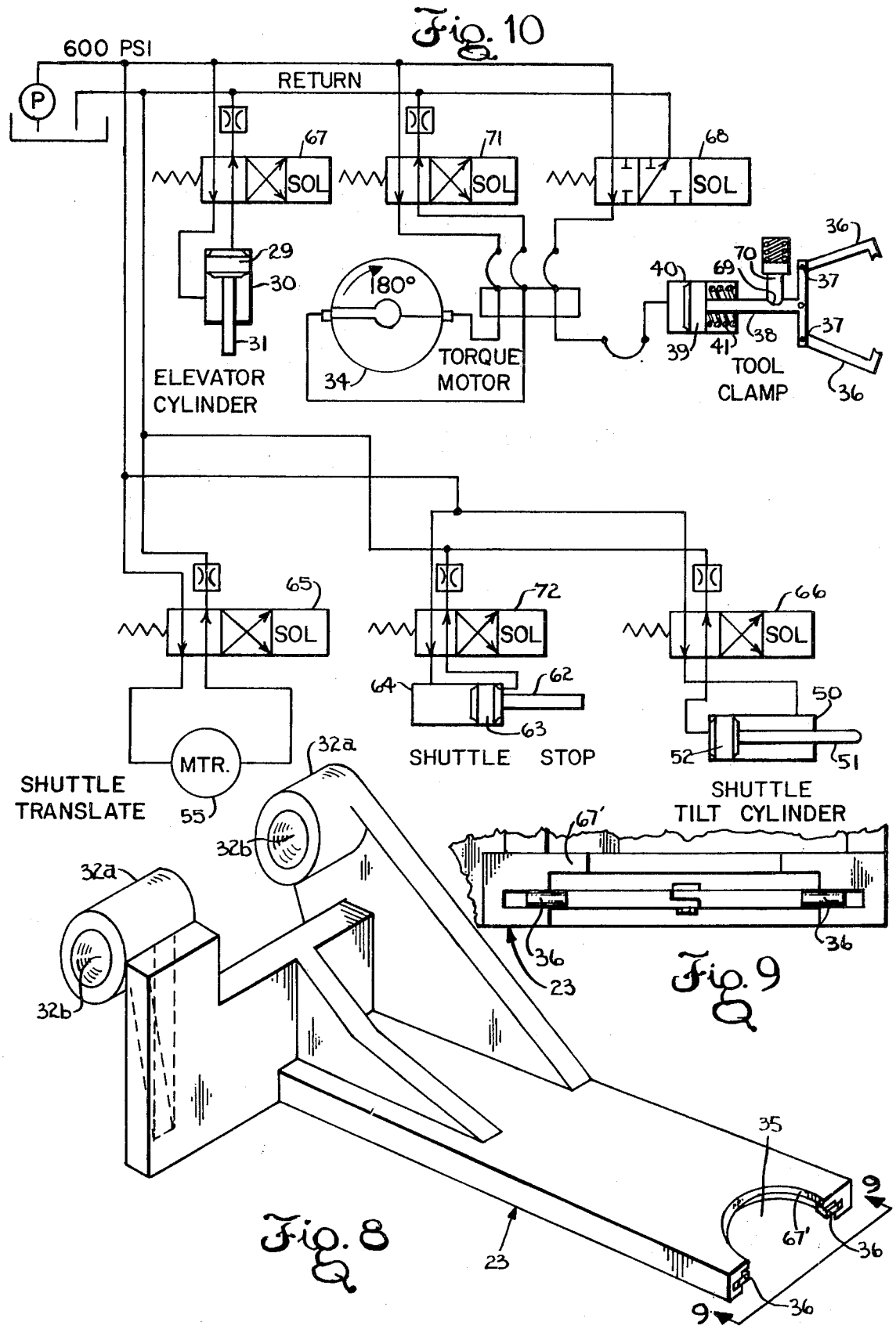

TOOL EXCHANGER FOR A PLURALITY OF SPINDLES OF A MACHINE TOOL

In machine tools having a plurality of vertically disposed spindles with the tools supported therein to cut different workpieces at the same time, it is necessary to replace the tools in the spindles at various times. This is normally due to completing a step in the machining operation of the machine tool.

Because of the relatively large size of this type of machine tool, it has previously been necessary for the operator to climb upon the surface of the workpiece to change the tools. This has necessitated a substantial downtime period in which the operator has to remove the tools from each of the spindles and then dispose the new tools in the spindles. While this tool-changing operation can be performed by one man, it is more convenient and more economical to use more than one man to perform this tool-changing operation. Furthermore, this substantial period of time to make the tool change increases the cost of machining.

The present invention satisfactorily overcomes the foregoing problem by providing a tool exchanger in which the tools, which are in the spindle, can be automatically removed therefrom and replaced by other tools. Thus, the present invention substantially reduces the downtime of the machine tool.

Additionally, the tool exchange mechanism of the present invention does not require the operator to have to climb upon the surface of the workpiece. Instead, the operator may unload tools, which have been removed from the spindles, during the next machining operation and load new tools in the shuttle, which transports the tools from a home position to spindle unloading and loading positions.

Since the operator is able to perform these operations during the machining operation, a substantial period of time is saved. Furthermore, the operator may perform these operations while standing on the floor. Additionally, the operator does not require any helper to load and unload tools from the shuttle.

This invention relates to a machine tool including a plurality of housings with each of the housings having a rotatable spindle. The spindles have their axes of rotation substantially parallel to each other. The machine tool has means to support a plurality of tools for use in the spindles and means to move the support means between a home position, a first position, and a second position. The support means has first means to support a first group of tools equal in number to the number of the spindles and second means to support a second group of tools equal in number to the number of the spindles. The first means receives tools when the support means is in its home position to form the first group of tools and the second means receives tools from the spindle when the support means is in its first position. The machine tool includes means to selectively transport tools between each of the spindles and the support means when the support means is in each of its first and second positions. The transporting means transports a tool when the support means is in its first position from at least one of the spindles to the support means for support by the second means for the support means. After the tool in at least one of the spindles has been received by the support means, the moving means moves the support means from its first position to its second position at which the transporting means transports one of the tools of the first group from the first means of the support means to each of the spindles from which a tool was removed when the support means was in its first position. After the first group of tools in the support means has been disposed in the spindles, the moving means moves the support means to its home position.

An object of this invention is to provide a machine tool having a plurality of spindles in which tools for all the spindles may be changed simultaneously.

Another object of this invention is to provide a tool exchanger for simultaneously unloading or loading tools for a plurality of spindles.

Other objects of this invention will be readily perceived from the following description, claims, and drawings.

The attached drawings illustrate a preferred embodiment of the invention, in which:

FIG. 1 is a front elevational view of a machine tool employing the tool exchanger of the present invention with the shuttle at the spindle unloading position;

FIG. 2 is an end elevational view of the machine tool of FIG. 1 including the tool exchanger of the present invention;

FIG. 3 is an enlarged fragmentary end elevational view, partly in section, of a portion of the machine tool including the tool exchanger of the present invention in different positions during the loading of the new set of tools;

FIG. 4 is an enlarged fragmentary end elevational view of a portion of the machine tool including the tool exchanger of the present invention and similar to FIG. 3 but after the new set of tools is in the spindles;

FIG. 5 is a sectional view of a portion of one of the spindles of the machine tool with one of the tools of the new set mounted therein;

FIG. 8 is a perspective view of an interchange arm for use with each of the spindles;

FIG. 9 is an elevational view taken along line 9—9 of FIG. 8 and showing the gripping mechanism for retaining the tool on the interchange arm;

Figure 6:
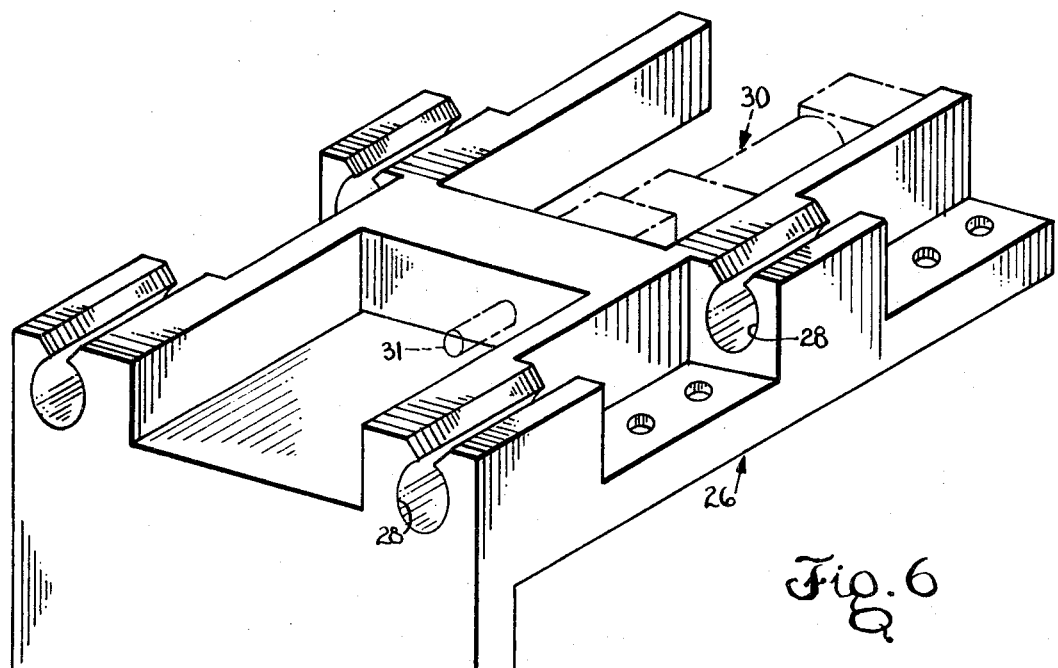
FIG. 6 is a perspective view of a bracket of the machine tool on which is supported an elevator having an interchange arm for one of the spindles.

FIG. 10 is a schematic diagram of a system for controlling the movements of the various elements to unload and load tools for each of the spindles of the machine tool; and FIG. 11 is a fragmentary top plan view, partly in section, of a portion of the shuttle in which the tools are supported and the cooperating relation with one of the interchange arms when the shuttle is at the spindle unloading position.

Referring to the drawings and particularly FIG. 1, there is shown a machine tool 10 having a plurality of vertically disposed spindle carriers 11 with each of the spindle carriers 11 having a spindle 12 (see FIG. 5), which is mounted within a quill 13. The spindle carriers 11 are fixed to a vertical saddle 14, which is slidably supported on a cross saddle 15 for vertical movement. The vertical saddle 14 is driven by a hydraulic motor 16 through a suitable drive mechanism.

The cross saddle 15 is supported on a pair of parallel crossways 17 and 18 for transverse movement by a hydraulic motor 18'. The horizontally disposed ways 17 and 18 are connected to a crossrail 19, which is supported by a pair of uprights 20. The uprights 20 and the crossrail 19 form a U-shaped frame, which straddles a worktable 21 on which workpieces are supported.

Each of the spindles 12 has a tool supported therein by a drawbar for performing cutting operations on one of the workpieces supported on the worktable 21. Each of the tools cooperates with a particular one of the workpieces so that each of the tools performs the same cutting operation on a different one of the workpieces at the same time.

As shown in FIG. 1, each of the spindles 12 has a tool 22 supported therein for performing the cutting operation on one of the workpieces supported on the worktable 21. When another cutting operation is to occur, each of the tools 22 is replaced by a tool 24. One of the tools 24 is supported in one of the spindles 12 in FIG. 5.

Each of the tools 22 or 24 is capable of being moved in all directions relative to the workpiece with which it performs the cutting operations. Thus, the spindle carriers 11 can be moved vertically and transversely relative to the worktable 21. The worktable 21 is movable longitudinally so that the workpieces move longitudinally relative to the spindle carriers 11.

Each of the spindle carriers 11 has an interchange arm 23 supported thereon for pivoting and sliding movement relative to the spindle carrier 11 and the spindle 12. Each of the interchange arms 23 is pivotally mounted on an elevator 25, which is mounted for vertical movement relative to the spindle carrier 11. Each of the elevators 25 is slidably supported on a cooperating L-haped bracket 26, which is fixed to the spindle carrier 11.

Figure 7:
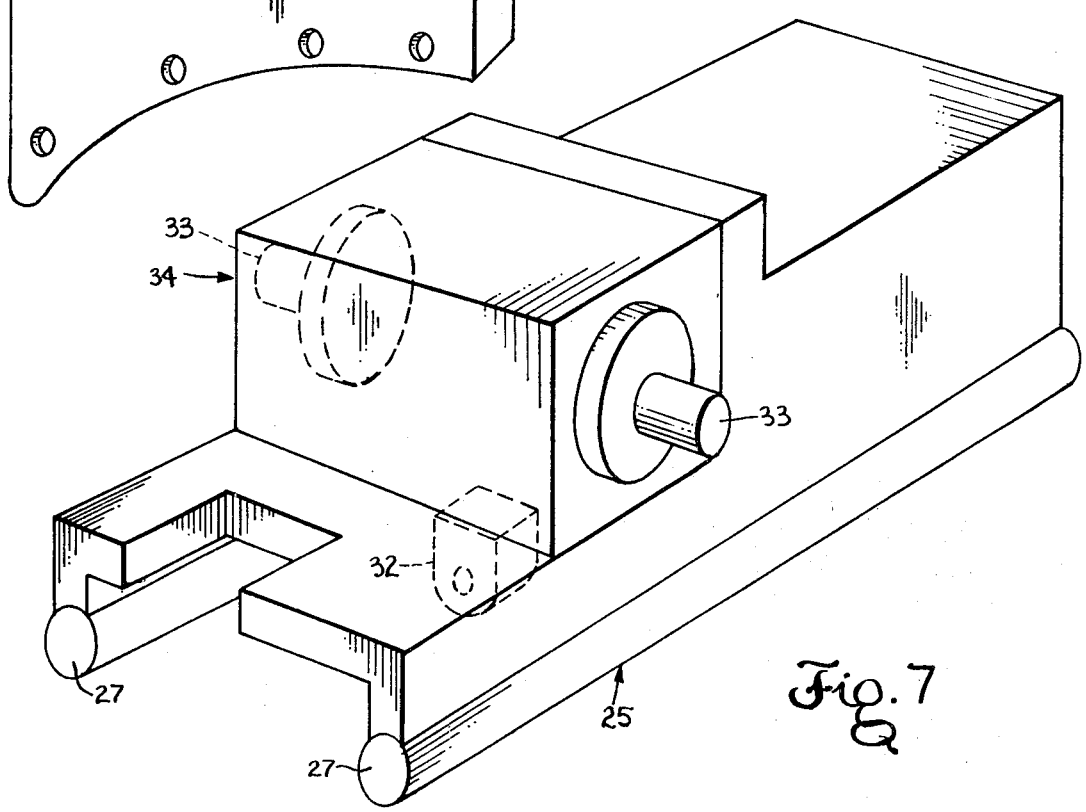
FIG. 7 is a perspective view of an elevator on which the interchange arm is supported.

As shown in FIG. 7, each of the elevators 25 has vertical ways 27 thereon. The vertical ways 27 are disposed within vertically disposed passages 28 (see FIG. 6) in the corresponding bracket 26. Each of the elevators 25 is moved by a piston 29 (see FIG. 10) in a cylinder 30. Each of the pistons 29 has its rod 31 connected to the corresponding elevator 25 through a connector 32 (see FIG. 7).

Accordingly, the position of each of the elevators 25 is determined by the position of the connected piston 29 within the cylinder 30. Thus, the vertical position of each of the interchange arms 23 is controlled by the piston 29 since the arm 23 moves vertically with the elevator 25 on which the arm 23 is pivotally mounted.

As previously mentioned, each of the interchange arms 23 is pivotally mounted on a corresponding one of the elevators 25. Each of the interchange arms 23 has a pair of ears 32a (see FIG. 8) with holes 32b therein to receive opposite ends of a shaft 33 (see FIG. 7) of a motor 34. By securing the opposite ends of the shaft 33 within the holes 32b in the ears 32a of the interchange arm 23, the interchange arm 23 pivots about the axis of the shaft 33 when the motor 34 is energized. Each of the motors 34 is mounted on a corresponding one of the elevators 25 for movement therewith.

As shown in FIG. 8, each of the interchange arms 23 has a semicircular cutout portion 35 within which a portion of the tool 22 or 24 may be disposed. The tool 22 or 24 is retained within the cutout portion 35 of the interchange arm 23 by a pair of cooperating grippers 36, which are pivotally mounted by a pair of cooperating grippers 36, which are pivotally mounted in the arm 23 as schematically shown at 37 in FIG. 10.

The tool 24 is gripped by the grippers 36 being disposed within a groove 37a (see FIG. 5) in an adapter ring 37b, which is secured to the tool 24. This produces a positive clamping of the tool 24 to the interchange arm 23. The tool 22 has a similar adapter ring 37c (see FIG. 4), which is gripped by the grippers 36 being disposed in a groove 37d in the adapter ring 37c.

The grippers 36 are connected to a piston rod 38 (see FIG. 10) of a piston 39, which is slidably mounted in a cylinder 40 that is supported on the interchange arm 23. Accordingly, when fluid is supplied to the cylinder 40, the grippers 36 are pivoted away from each other to release the tool 22 or 24. Likewise, when fluid is removed from the cylinder 40, a spring 41 in the cylinder 40 acts on the piston 39 to urge the grippers 36 into gripping engagement with the tool 22 or 24.

By both pivoting and vertically moving the interchange arm 23, the interchange arm 23 may remove one of the tools 22 or 24 from one of the spindles 12 of one of the spindle carriers 11 or insert one of the tools 22 or 24 therein. The grippers 36 are controlled to insure that the tool 22 or 24 is locked to the interchange arm 23 whenever the tool 22 or 24 is moved away from the spindle 12 and released from the interchange arm 23 whenever the tool 22 or 24 is supported in the spindle 12.

Each of the interchange arms 23 is employed to remove the tool 22 from the cooperating spindle 12 and transport it to a shuttle 42 (see FIGS. 1 to 4) and to transport one of the tools 24, which is supported on the shuttle 42, to the spindle 12. The shuttle 42 is slidably supported on a shuttle track 43, which comprises a plurality of connected hollow rods, for transverse movement between a park or home position and spindle unloading and loading positions for cooperating with the spindle carriers 11.

The track 43 has a vertical hollow rod 43' (see FIGS. 1 and 4) at one end connected to a bracket 44 and a vertical hollow rod 45 (see FIG. 1) at its other end connected to a bracket (not shown), which is similar to the bracket 44, in the same manner as the rod 43' is connected to the bracket 44. The bracket 44 is pivotally connected by a pin 46 (see FIGS. 2 and 4) to a bracket 47, which is fixed to one end of the crossrail 19. The bracket, which is secured to the rod 45 of the track 43, is pivotally connected by a pin (not shown) to a bracket 49 (see FIG. 1), which is fixed to the other end of the crossrail 19, in the same manner as the bracket 44 is pivotally connected to the bracket 47. Accordingly, the shuttle 42 and the track 43 are pivotally mounted with respect to the spindle carriers 11.

The pivotal movement of the shuttle 42 is controlled through pivotally connecting a cylinder 50 to the bracket 47 and pivotally connecting a piston rod 51 of a piston 52 (see FIG. 10), which is disposed within the cylinder 50, to the bracket 44. A similar arrangement, not shown or described, exists between the bracket 49 and the bracket, which is connected to the rod 45 of the shuttle track 43.

Accordingly, when fluid is supplied to the cylinder 50 to urge the piston rod 51 out of the cylinder 50, the shuttle 42 is pivoted away from the spindle carriers 11. Supply of fluid to the opposite side of the piston 52 in the cylinder 50 returns the shuttle 42 toward the spindle carriers 11.

The shuttle 42 rides along the track 43 through having rollers 53 (see FIG. 4) at its upper end riding on a longitudinal hollow rod 53' on the upper end of the track 43 and rollers 54 at its lower end riding on a longitudinal hollow rod 54' on the lower end of the track 43. The shuttle 42 is driven along the track 43 by a hydraulic motor 55 (see FIGS. 1, 2, and 10), which is supported on the bracket 44; the motor 55 has a sprocket 56 (see FIG. 1) on its shaft for rotation therewith. A chain 57 extends around the sprocket 56 and a sprocket 58, which is rotatably supported on the bracket connected to the rod 45 of the track 43. The chain 57 is secured to the shuttle 42 so that driving of the chain 57 causes horizontal movement of the shuttle 42 along the track 43.

The shuttle 42 includes a bottom flange 59 having a first set of spaced ears 59a (one shown in FIG. 11) extending horizontally therefrom with each having a pocket or opening 59b therein to receive one of the tools 22 from one of the spindles 12. The bottom flange 59 has a second set of ears 59c (one shown in FIG. 11) extending horizontally therefrom with each having a pocket or opening 59d to receive one of the tools 24.

Each of the ears 59a has a support block 60 disposed therebeneath with an opening therein aligned with the pocket or opening 59b in the ear 59a so that the support block 60 aids in supporting the tool 22. Each of the ears 59c has a support block 60' disposed therebeneath with an opening therein aligned with the pocket or opening 59d in the ear 59c so that the support block 60' aids in supporting the tool 24.

As shown in FIG. 1, the shuttle 42 has three of the support blocks 60 and three of the support blocks 60'. Thus, as shown in FIG. 1, the support blocks 60' are the first, third, and fifth support blocks from the right side of the shuttle 42, and the support blocks 60 are the second, fourth, and sixth support blocks from the right side of the shuttle 42.

Each of the ears 59a and 59c is designed to cooperate with the cutout portion 35 of the interchange arm 23 so that the tool 22 or 24 in the ear 59a or 59c, respectively, can move relative to the interchange arm 23 when the shuttle 42 pivots. This arrangement also enables transfer of tools between the interchange arm 23 and the pockets or openings 59b and 59d in the ears 59a and 59c, respectively.

When the motor 55 is energized to move the shuttle 42 from its park or home position (This is the phantom line position of FIG. 1), the shuttle 42 is moved transversely until a stop 61 on the shuttle 42 engages a piston rod 62 of a piston 63 (see FIG. 10), which is disposed within a cylinder 64. The cylinder 64 is supported by the vertical saddle 14.

Thus, the amount of movement of the shuttle 42 depends upon the position of the cross saddle 15, which slidably supports the vertical saddle 14. While the cross saddle 15 is shown intermediate the ends of the crossways 17 and 18, it should be understood that the cross saddle 15 can be moved to either end of the crossways 17 and 18. Therefore, the amount of movement of the shuttle 42 until it engages the piston rod 62 can vary substantially.

At this time, the pockets or openings 59b in the ears 59a of the flange 59 on the shuttle 42 are empty and are disposed to receive the tools 22, which are supported within the spindles 12, from the interchange arms 23. The ears 59c, which have the tools 24 in the pockets or openings 59d therein, are disposed so as to not interfere with the transfer of the tools 22 from the spindles 12 to the pockets 59b in the ears 59a of the shuttle 42.

After the tools 22 within the spindles 12 have been transferred by the interchange arms 23 to the pockets 59b in the ears 59a of the shuttle 42, the piston rod 62 is retracted into the cylinder 64 by applying fluid to one side of the piston 62 (see FIG. 10) and removing it from the other side. This allows the motor 55, which has remained activated, to advance the shuttle 42 to a second or spindle load position in which the tools 24, which are supported in the pockets 59d in the ears 59c of the shuttle 42, may be transferred to the empty spindles 12 by the interchange arms 23.

After the tools 24 have been transferred from the shuttle 42 to the spindles 12, the shuttle motor 55 is then reversed, and the shuttle 42 is returned to its home or park position (the phantom line position of FIG. 1). The shuttle 42 abuts a stop 64' on the shuttle track 43 so that the shuttle 42 automatically stops in its home or park position (the phantom line position of FIG. 1).

In this position, the tools 22, which have been removed from the spindle 12 by the interchange arms 23 and disposed in the pockets 59b in the ears 59a of the shuttle 42, are manually removed by the operator. A new set of the tools, which are next to be transferred to the spindle 12, are then disposed within the pockets or openings 59d in the ears 59c of the shuttle 42. Of course, it should be understood that the new tools could be added before the tools 22, which are in the pockets 59b in the ears 59a of the shuttle 42, are removed from the shuttle 42 since they utilize different sets of pockets.

Considering the operation of the tool exchanger of the present invention and referring to FIG. 10, it should be understood that each of the spindle carriers 11 has one of the elevator cylinders 30, one of the torque motors 34, and one set of the grippers 36 associated therewith. Thus, with three of the spindle carriers 11, there would be three of the elevator cylinders 30, three of the motors 34, and three sets of the grippers 36. However, these have been shown and will be described for only one of the spindle carriers 11 since all operate in the same manner.

It also should be understood that there is only the single-shuttle motor 55 and the single-shuttle stop cylinder 64. There are two of the shuttle pivot cylinders but only the cylinder 50 has been shown and described as these operate in unison.

When each of the spindles 12 has one of the tools 22 supported therein and the shuttle 42 is in the phantom line position of FIG. 1 with a new set of the tools 24 disposed in the pockets or openings 59d in the ears 59c, the shuttle 42 is ready to be moved to the solid line position of FIG. 1. The movements of the shuttle 42 and the tool exchange mechanism will be described for use with an automatic control system. However, it should be understood that the various operations could be performed manually by the operator if desired.

A solenoid 65 (see FIG. 10) is energized to cause the motor 55 to rotate in a direction to move the shuttle 42 toward the solid line position of FIG. 1. The movement of the shuttle 42 is stopped by engagement of the stop 61 on the shuttle 42 with the piston rod 62 of the shuttle stop cylinder 64. This aligns the empty set of pockets 59b in the ears 59a of the shuttle 42 with the spindle carriers 11.

When the shuttle 42 is in the solid line position of FIG. 2, it would interfere with movement of each of the interchange arms 23. Accordingly, it is necessary to pivot the shuttle 42 from the solid line position of FIG. 2 to the phantom line position of FIG. 2 before each of the interchange arms 23 can be moved to a position in which the tool 22, which is within the spindle 12, can be transferred to one of the empty pockets 59b in the ears 59a of the shuttle 42.

Therefore, when the shuttle 42 has reached the solid line position of FIG. 1, a limit switch (not shown) is activated to indicate to the automatic control system that the shuttle 42 is in the solid line position of FIG. 1. Then, the automatic control system causes energization of solenoids 66 and 67 (see FIG. 10). The energization of the solenoid 66 extends the piston rod 51 out of the cylinder 50 to cause pivotal movement of the shuttle 42. The energization of the solenoid 67 results in the elevator 25 moving downwardly to move the interchange arm 23 away from its home position adjacent the spindle 12.

The downward movement of the elevator 25 is stopped after a very short period of time because a shoulder or flange 67' (see FIGS. 5 and 8) on the interchange arm 23 engages a portion of the adapter ring 37c on the tool 22. Since the tool 22 is retained within the spindle 12 by the drawbar, the adapter ring 37c on the tool 22 functions as a stop to limit downward movement of the elevator 25.

When the elevator 25 starts its downward movement, a solenoid 68 (see FIG. 10) is energized to cause the grippers 36 to engage the tool 22 to connect the tool 22 to the interchange arm 23. The energization of the solenoid 68 causes the grippers 36 to pivot and engage the tool 22.

During the time that the tool 22 is held within the spindle 12 by the drawbar, the grippers 36 must be retained in the position in which they do not grip the tool 22. Accordingly, the piston rod 38 has a notch 69 (see FIG. 10) therein to receive a spring-biased plunger 70. This latches the grippers 36 in the nonlocking position with respect to the tool 22 so the tool 22 can rotate with the spindle 12 during the cutting operation.

When a predetermined period of time has elapsed after the solenoid 67 has been energized by the automatic control system, the drawbar releases the tool 22 from the spindle 12. When this occurs, the elevator 25 moves the tool 22 downwardly therewith since the grippers 36 have previously gripped the tool 22 to connect it to the interchange arm 23.

Upon completion of downward movement of the elevator 25, a limit switch (not shown) is activated to indicate to the automatic control system that downward movement of the elevator 25 is completed. Then, the automatic control system causes energization of a solenoid 71 to activate the motor 34. This pivots the interchange arm 23 through 180° to the phantom line position of the interchange arm 23 in FIG. 3 in which the cutting portion of the tool 22 is located above the interchange arm 23. It should be understood that the tool 22 is supported in the interchange arm 23 at this time rather than the tool 24 as shown in FIG. 3.

When the motor 34 completes rotation through 180° to position the interchange arm 23 in the phantom line position of FIG. 3 in which the cutting portion of the tool 22 is above the interchange arm 23, a limit switch (not shown) is activated to indicate that rotation of the motor 34 is completed. The automatic control system then deenergizes the solenoid 67 (see FIG. 10) to raise the elevator 25 upwardly so that the interchange arm 23 is moved to the solid line position of FIG. 3 but with the tool 22 supported by the interchange are 23.

When the elevator 25 completes its upward movement, a limit switch (not shown) is activated to indicate to the automatic control system that upward movement of the elevator 25 is completed. Then, the automatic control system causes deenergization of the solenoid 66 (see FIG. 10) to return the shuttle 42 to the phantom line position of FIG. 3 and the position of FIG. 4. As shown in FIG. 3, this positions the shuttle 42 so that the empty pockets 59b in the ears 59a of the flange 59 on the shuttle 42 can receive the tools 22, which are supported on the interchange arm 23.

When the shuttle 42 is returned to the phantom line position of FIG. 3 and the position of FIG. 4, a limit switch (not shown) is activated to indicate to the automatic control system that the shuttle 42 has completed its pivotal movement. Then, the automatic control system causes energization of the solenoid 67 (see FIG. 10) to again move the elevator 25 downwardly.

As the elevator 25 moves downwardly, a cam (not shown) on the elevator 25 activates a limit switch (not shown) when the elevator 25 reaches a certain position during its downward travel. This signal to the automatic control system causes the solenoid 68 (see FIG. 10) to be energized whereby the grippers 36 are released from gripping the tool 22. The location of the limit switch in conjunction with the cam configuration insure that release of the grippers 36 occurs to allow the tool 22 to be supported solely within the pocket or opening 59b in the ear 59a of the shuttle 42.

It should be understood that the limit switch, which indicates specific positions of the elevator 25 during its travel between its upper and lower positions, is activated by the cam on the elevator 25 during each movement of the elevator 25 in either its upward or downward travel. However, the automatic control system responds to the signal from this limit switch only at the times when the tool which is supported in the interchange arm 23 is to be transferred to the shuttle 42 and when the tool which is supported in the shuttle 42 is to be transferred to the interchange arm 23.

The configuration of the cam on the elevator 25 causes the limit switch to be activated at a different vertical position of the elevator 25 during its downward travel than during its upward travel. The limit switch is activated much closer to the lower position of the elevator 25 during upward travel of the elevator 25 than during downward travel.

At the completion of the downward movement of the elevator 25, the interchange arm 23 is in the phantom line position of FIG. 3. However, it should be understood that the interchange arm 23 is cooperating with the tool 22 at this time rather than the tool 24 as shown.

When the elevator 25 completes its downward movement, the limit switch is again activated to indicate this. As a result of this signal, the automatic control system causes energization of the solenoid 66 (see FIG. 10) to pivot the shuttle 42 away from the spindle carriers 11 to the phantom line position of FIG. 3.

With the shuttle 42 now supporting both the tools 22, which have been removed from the spindles 12, and the tools 24, which are to be inserted in the spindles 12, the completion of the pivotal movement of the shuttle 42 away from the spindle carriers 11 activates the limit switch to indicate this to the automatic control system. Then, the automatic control system causes a solenoid 72 (see FIG. 10) to be energized to cause retraction of the piston rod 62 into the shuttle stop cylinder 64.

Since the shuttle motor 55 is still activated for rotation in the same direction, the retraction of the piston rod 62 causes the shuttle 42 to move to the left in FIG. 1 to a second position in which the pockets or openings 59d in the ears 59c of the shuttle 42 are now aligned with the spindle carriers 11. It should be understood that the pivoting of the shuttle 42 away from the spindle carriers 11 enables the shuttle 42 to move transversely without engaging any of the interchange arms 23, which would stop movement of the shuttle 42 because of engagement with the tools 22 in the shuttle 42. It should be noted that the bifurcated ends of the interchange arm 23 still surround each of the tools 22 in the shuttle 42 until the shuttle 42 is pivoted.

When the shuttle 42 has moved to its second or spindle load position due to retraction of the piston rod 62 into the shuttle stop cylinder 64, a limit switch (not shown) is activated. This signal to the automatic control system causes the solenoid 66 (see FIG. 10) to again be deenergized. This results in the shuttle 42 being pivoted to return the shuttle 42 to the phantom line position of FIG. 3. In this position, the tools 24, which are to be inserted in the spindles 12, are disposed within the cutout portions 35 of the interchange arms 23.

When the shuttle 42 returns to the phantom line position of FIG. 3 and the position of FIG. 4, the limit switch which indicates this position of the shuttle 42 is again activated. Upon the automatic control system receiving this signal, the solenoid 67 (see FIG. 10) is deenergized to cause the elevator 25 to move upwardly.

As the elevator 25 moves upwardly, the limit switch is activated by the cam on the elevator 25. This signal to the automatic control system causes energization of the solenoid 68 whereby the grippers 36 are moved into gripping engagement with the tool 24 to connect the tool 24 to the interchange arm 23. Because of the configuration of the cam on the elevator 25 and the location of the limit switch, the tool 24 is secured to the interchange arm 23 before the tool 24 ceases to be supported by the shuttle 42.

After the elevator 25 completes its upward movement to the solid line position of the interchange arm 23 in FIG. 3, the limit switch which indicates that the elevator 25 is in its upper position is again activated. When the automatic control system receives this signal, the solenoid 66 (see FIG. 10) is again energized to pivot the shuttle 42 away from the spindle carriers 11.

Upon completion of pivoting of the shuttle 42 to the solid line position of FIG. 3, the limit switch which indicates this position of the shuttle 42 is again activated. As a result of receiving this signal, the automatic control system causes energization of the solenoid 67 (see FIG. 10) to again move the elevator 25 downwardly.

Upon completion of downward movement of the elevator 25, the limit switch which indicates this lowermost position of the elevator 25 is again activated. Upon receiving this signal, the automatic control system deenergizes the solenoid 71 (see FIG. 10) to reverse the direction of rotation of the motor 34. This causes the interchange arm 23 to pivot to the position in which the tool 24 can be inserted within the spindle 12.

When the motor 34 completes rotation to position the tool 24 for insertion within the spindle 12, a limit switch (not shown) is activated. Upon receiving this signal, the automatic control system deenergizes the solenoid 67 (see FIG. 10) to cause the elevator 25 to move upwardly.

As the elevator 25 is moved upwardly, the automatic control system also starts rotation of the spindle 12 at a low speed. The transmission for the drive of the spindle 12 had been shifted to low speed when the solenoid 65 was energized to move the shuttle 42 to the solid line position of FIG. 1.

The upward movement of the elevator 25 raises the tool 24 against drive keys 73 (one shown in FIG. 5) on the spindle 12 to the position of FIG. 4. When the keys 73 on the spindle 12 align with slots in the tool 24, rotation of the spindle 12 stops. This is accomplished by the automatic control system receiving a signal from a limit switch (not shown) which is activated when the tool 24 is moved upwardly in the spindle 12 sufficiently to have the drive keys 73 on the spindle 12 disposed within the slots in the tool 24. When this signal is received by the automatic control system, rotation of the spindle 12 is stopped, and the drawbar is actuated by the automatic control system to lock the tool 24 to the spindle 12.

When the drawbar completes locking of the tool 24 to the spindle 12 by a timed cycle, a relay (not shown) is activated to indicate this to the automatic control system. Upon receiving this signal, the automatic control system causes deenergization of the solenoid 68 (see FIG. 10).

This releases the grippers 36 from clamping engagement with the tool 24 and results in the plunger 70 being disposed within the notch 69 in the piston rod 38. This insures that the grippers 36 do not interfere with the rotation of the spindle 12 and the cutting tool 24.

When the grippers no longer connect the tool 24 to the interchange arm 23, the elevator 25 moves upwardly until the interchange arm 23 abuts against a pad 75 (see FIGS. 3 and 4) on the quill 13 of the spindle carrier 11. This determines the home position of the interchange arm 23 during cutting operations.

The quill 13 for each of the spindles 12 is adjustable by a mechanism 77 (see FIGS. 3 and 4) so that all the tools 22 or 24 will be at the same height irrespective of their lengths. It should be understood that the movement of the quill 13, which supports the spindle 12, causes the spindle 12 to also move therewith. This insures that the cutting tools 22 or 24 all terminate in the same horizontal plane so that the workpieces are simultaneously engaged by all of the tools 22 or 24.

When the adjusting mechanism 77 moves the quill 13, it also moves a bearing retainer 78. The furtherest extension of the quill 13 is shown in phantom lines in FIG. 3.

After the grippers 36 have been released from the tool 24 by deenergizing the solenoid 68 (see FIG. 10), the limit switch is activated to provide a signal to the automatic control system that the grippers 36 have been released from to tool 24. Upon receipt of this signal, the automatic control system causes the solenoid 66 to be deenergized to return the shuttle 42 to the position of FIG. 4.

When the shuttle 42 returns to the position of FIG. 4, the limit switch (not shown) which indicates this position of the shuttle 42 is activated. When this signal is supplied to the automatic control system, the solenoid 65 (see FIG. 10) is deenergized to rotate the motor 55 in the opposite direction to move the shuttle 42 transversely or horizontally to the phantom line position of FIG. 1 where the shuttle 42 is stopped by engaging the stop 64'. At this time, the automatic control system also causes deenergization of the solenoid 72 so that the piston rod 62 is returned to the position of FIGS. 1 and 10.

The automatic control system then causes the spindle carriers 11 to be driven at a desired speed. Then, the next cutting operation is started by the operator.

The shuttle 42 is now positioned to have the tools 22, which have been removed from the spindles 12, removed therefrom by the operator. New tools are then disposed within the shuttle 42 by the operator. The previously described operation is then repeated when the shuttle 42 is next to be moved to remove the tools 24, which are in the spindles 12. This is when the machining operation by the tools 24 in the spindles 12 is completed.

While the present invention has shown and described the interchange mechanism of the present invention as being employed with three of the spindle carriers 11, it should be understood that any suitable number may be employed. This would necessitate a similar number of cooperating elements in accordance with the number of the spindle carriers 11.

While the present invention has shown and described the tools 22 as being simultaneously unloaded from each of the spindles 12 and the tools 24 as simultaneously loaded into each of the spindles 12, it should be understood that such is not a requisite for operation of the present invention. Thus, for example, one of the tools 22 might be removed from the spindle 12 because it breaks or becomes dull.

Furthermore, it is not necessary that all of the tools 22 be withdrawn simultaneously since each has its own control system. However, the movements of the shuttle 42 must be controlled so that there is no movement of the shuttle 42 until movements of all of the interchange arms 23 have been completed for a particular portion of the unloading or loading cycle.

An advantage of this invention is that the time for changing tools in a machine tool having a plurality of spindles is reduced. Another advantage of this invention is that the operator can do all of the tool loading and unloading while standing on the floor.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A machine tool including:
   a plurality of housings;
   each of said housings having a rotatable spindle, said spindles having their axes of rotation substantially parallel to each other;
   means to support a plurality of tools for use in said spindles;
   means to move said support means between a home position, a first position, and a second position;
   said support means having:
   first means to support a first group of tools equal in number to the number of said spindles;
   second means to support a second group of tools equal in number to the number of said spindles;
   said first means receiving tools when said support means is in its home position to form the first group of tools;
   and said second means receiving tools from said spindle when said support means is in its first position;
   means to selectively transport tools between each of said spindles and said support means when said support means is in each of its first and second positions;
   said transporting means comprising separate means for each of said spindles;
   each of said separate means of said transporting means being supported by a separate one of said housings;
   said transporting means transporting a tool when said support means is in its first position from at least one of said spindles to said support means for support by said second means of said support means;
   said moving means moving said support means from its first position to its second position after the tool in at least one of said spindles has been received by said support means;
   said transporting means transporting one of the tools of said first group when said support means is in its second position from said first means of said support means to each of said spindles from which a tool was removed when said support means was in its first position;
   and said moving means moving said support means to its home position after said first group of tools in said support means has been disposed in said spindles.

2. The machine tool according to claim 1 in which each of said separate means of said transporting means includes a separate interchange arm.

3. The machine tool according to claim 2 including:
   separate means to mount each of said interchange arms on a separate one of said housings for pivotal and sliding movement;
   and means to mount said support means for cooperating movement with the movement of said arms.

4. The machine tool according to claim 3 in which:
   said mounting means for said support means includes:
   means to mount said support means for pivotal movement relative to said housings;
   and means to mount said support means for transverse movement between its home position, first position, and second position.

5. The machine tool according to claim 4 in which said transverse mounting means is mounted for pivotal movement with said support means.

6. The machine tool according to claim 5 including means to coordinate the pivotal and transverse movements of said support means with the pivotal and sliding movements of said interchange arms.

7. The machine tool according to claim 3 in which:
   each of said separate mounting means includes;
   means slidably movable on one of said housings;
   and means to pivotally mount said interchange arm on said slidably movable means.

8. The machine tool according to claim 3 including means to coordinate movements of said support means with the movements of said interchange arms.

9. The machine tool according to claim 3 including means to mount said support means for pivotal movement relative to said housings.

10. The machine tool according to claim 1 including:
    means to stop said support means at its first position when said moving means is moving said support means to align each of said first means with one of said separate means of said transporting means;
    and means to render said stop means ineffective after said support means has received the tools from said spindles to allow said support means to be moved to its second position to align each of said second means with one of said separate means of said transporting means.

11. The machine tool according to claim 1 in which:
said separate means of said transporting means are rendered effective simultaneously.

12. The machine tool according to claim 11 in which:
each of said separate means of said transporting means is supported by a separate one of said housings;
means to stop said support means at its first position when said moving means is moving said support means to align each of said first means with one of said separate means of said transporting means;
and means to render said stop means ineffective after said support means has received the tools from said spindles to allow said support means to be moved to its second position to align each of said second means with one of said separate means of said transporting means.

13. The machine tool according to claim 1 including:
means to stop said support means at its first position when said moving means is moving said support means;
and means to render said stop means ineffective after said support means has received the tools from said spindles to allow said support means to be moved to its second position.

14. The machine tool according to claim 1 in which said transporting means transports a tool from each of said spindles to said second means of said support means when said support means is in its first position and a tool of the first group from said first means of said support means to each of said spindles when said support means is in its second position.

* * * * *